US007003280B2

(12) United States Patent
Pelaez et al.

(10) Patent No.: US 7,003,280 B2
(45) Date of Patent: Feb. 21, 2006

(54) METHOD AND SYSTEM FOR PROCESSING ADJUSTMENTS TO THE TYPE AND QUALITY OF MULTIMEDIA COMMUNICATION SESSIONS

(75) Inventors: Mariana Benitez Pelaez, Naperville, IL (US); Karla Rae Hunter, Naperville, IL (US); Charu Verma, Darien, IL (US); Kamal K. Verma, Darien, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 210 days.

(21) Appl. No.: 10/717,694

(22) Filed: Nov. 20, 2003

(65) Prior Publication Data

US 2005/0113062 A1 May 26, 2005

(51) Int. Cl.
*H04M 11/00* (2006.01)
(52) U.S. Cl. .................. 455/406; 455/405; 455/445; 379/114.01; 379/114.03
(58) Field of Classification Search ................ 455/406, 455/405, 445; 379/114.01, 114.03
See application file for complete search history.

(56) References Cited

U.S. PATENT DOCUMENTS

| 6,487,401 | B1 * | 11/2002 | Suryanarayana et al. ... 455/406 |
|---|---|---|---|
| 2003/0119478 | A1 * | 6/2003 | Nagy et al. .................. 455/408 |
| 2003/0195000 | A1 * | 10/2003 | Rodriguez ............... 455/435.1 |
| 2004/0192297 | A1 * | 9/2004 | Erskine et al. ............ 455/432.1 |
| 2004/0209595 | A1 * | 10/2004 | Bekanich ..................... 455/405 |
| 2005/0020258 | A1 * | 1/2005 | Aslanian .................. 455/426.1 |
| 2005/0032505 | A1 * | 2/2005 | Himelhoch ................. 455/405 |

\* cited by examiner

*Primary Examiner*—Danh Cong Le

(57) ABSTRACT

A method of processing multimedia calls in a multimedia telecommunications network. The method comprises: receiving at a first network element a multimedia call from a caller using a first communication device to a prepaid wireless user using a second communication device, the prepaid wireless user having an amount of airtime remaining for the second communication device; displaying in real-time a plurality of available call features and the amount of airtime remaining on the second communication device; prompting the prepaid wireless user to select the call features from the plurality of available call features via the second communication device; receiving the user's selected call features at the first network element; routing the selected call features from the first network element to a second network element and then to the caller; setting up the call according to the selected call features; and connecting the call.

18 Claims, 2 Drawing Sheets

METHOD AND SYSTEM FOR PROCESSING ADJUSTMENTS TO THE TYPE AND QUALITY OF MULTIMEDIA COMMUNICATION SESSIONS

FIELD OF THE INVENTION

The present invention relates generally to the art of telecommunications, and, more particularly, to a method and system for processing adjustments to the type and/or quality of multimedia communication sessions made by prepaid wireless users in multimedia telecommunication networks.

BACKGROUND OF THE INVENTION

Wireless communication networks allow mobile devices to communicate with each other and other networks, such as the Internet and the public switched telephone network. First and second generation wireless telephone systems are generally constrained in the amount of bandwidth available for communication. This limits capacity and also the types of services that can be provided. Third generation wireless systems, which are being developed through the 3rd Generation Partnership Project (3GPP), hold the promise of greater bandwidth, thereby increasing capacity and allowing for enhanced services, such as multimedia services. 3GPP is the new worldwide standard for the creation, delivery, and playback of multimedia over new, high-speed wireless networks. 3GPP enables the free sharing of multimedia files between a variety of devices, including cell phones, personal digital assistants (PDAs), and notebook and desktop computers. 3GPP devices include, in addition to a voice communication interface, capability for communication of data and display of data, including video.

The various types of media services available through 3G (3rd Generation) devices, such as telephony, fax, video telephony, high-quality voice transmission (audio), information retrieval, file transfer, messaging services (short message service, fax message service, etc.), Internet access, and paging, require different amounts of bandwidth. Bandwidth describes the transmission capacity of a medium in terms of a range of frequencies. A greater bandwidth indicates the ability to transmit a greater amount of data over a given period of time.

Prepaid wireless service requires payment from the subscriber before wireless providers will extend service and is a convenient alternative to the typical long-term contracts offered by wireless companies. Like prepaid phone cards, these plans let users buy a specified amount of airtime to be drawn from until it runs out. Wireless service can be bought in blocks such as $25, $50 or $100. Typically, prepaid wireless is offered as a rechargeable service in which there is a warning and, at the same time, the option of recharging. The plans are popular with wireless users who want to keep a close watch on their wireless expenses and are becoming more widely available.

With respect to these prepaid wireless services, the actual amount of units (or minutes) available for each block of airtime will vary depending on the type of call session (e.g., voice, video, streaming video, text, images, file transfers) and the quality of the call (e.g., low or high quality). For instance, if the call from the caller to the customer is initially to be a real-time multimedia call, including video data, then the bandwidth requirements for the call would initially be set up for a high quality class of service, which requires substantial bandwidth in order to accommodate real-time transmission of video data.

Currently, however, a prepaid wireless user is not able to change the bandwidth requirements for a communication session based upon the amount of pre-paid units available (e.g. airtime). Therefore, a need exists for a method and system for processing adjustments to the type and/or quality of multimedia communication sessions made by prepaid wireless users in multimedia telecommunication networks.

SUMMARY OF THE INVENTION

In accordance with one aspect of the present invention, a method of processing multimedia calls in a multimedia telecommunications network is provided. The method begins with receiving at a first network element a multimedia call from a caller using a first communication device to a prepaid wireless user using a second communication device, where the prepaid wireless user has an amount of airtime remaining for the second communication device. Next, a plurality of available call features and the amount of airtime remaining are displayed in real-time on the second communication device. The prepaid wireless user is then prompted to select the call features from the plurality of available call features via the second communication device. The user's selected call features are received at the first network element and then routed through a second network element to the caller. Finally, the call is set-up according to the selected call features, and the call is connected.

In accordance with another aspect of the present invention, a system for processing multimedia calls in a multimedia telecommunications network is provided. The system includes means for receiving a multimedia call from a caller using a first communication device to a prepaid wireless user using a second communication device, where the prepaid wireless user has an amount of airtime remaining for the second communication device, means for displaying in real-time a plurality of available call features and the amount of airtime remaining on the second communication device, means for prompting the prepaid wireless user to select the call features from the plurality of available call features via the second communication device, means for receiving the user's selected call features at the first network element, means for routing the selected call features from the first network element to a second network element and then to the caller, means for setting up the call according to the selected call features, and means for connecting the call.

An advantage of the present invention is that a prepaid wireless user is thus able to change the bandwidth requirements for a communication session based upon the amount of pre-paid units available.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

For simplicity and ease of reference, the acronyms listed below shall be used in the specification to refer to structural and/or functional network elements, relevant telecommunications standards, protocols and/or services, terminology, etc., as they are commonly known in the telecommunications art, except to the extent they have been modified in accordance with aspects of the present invention.

Figure 1:
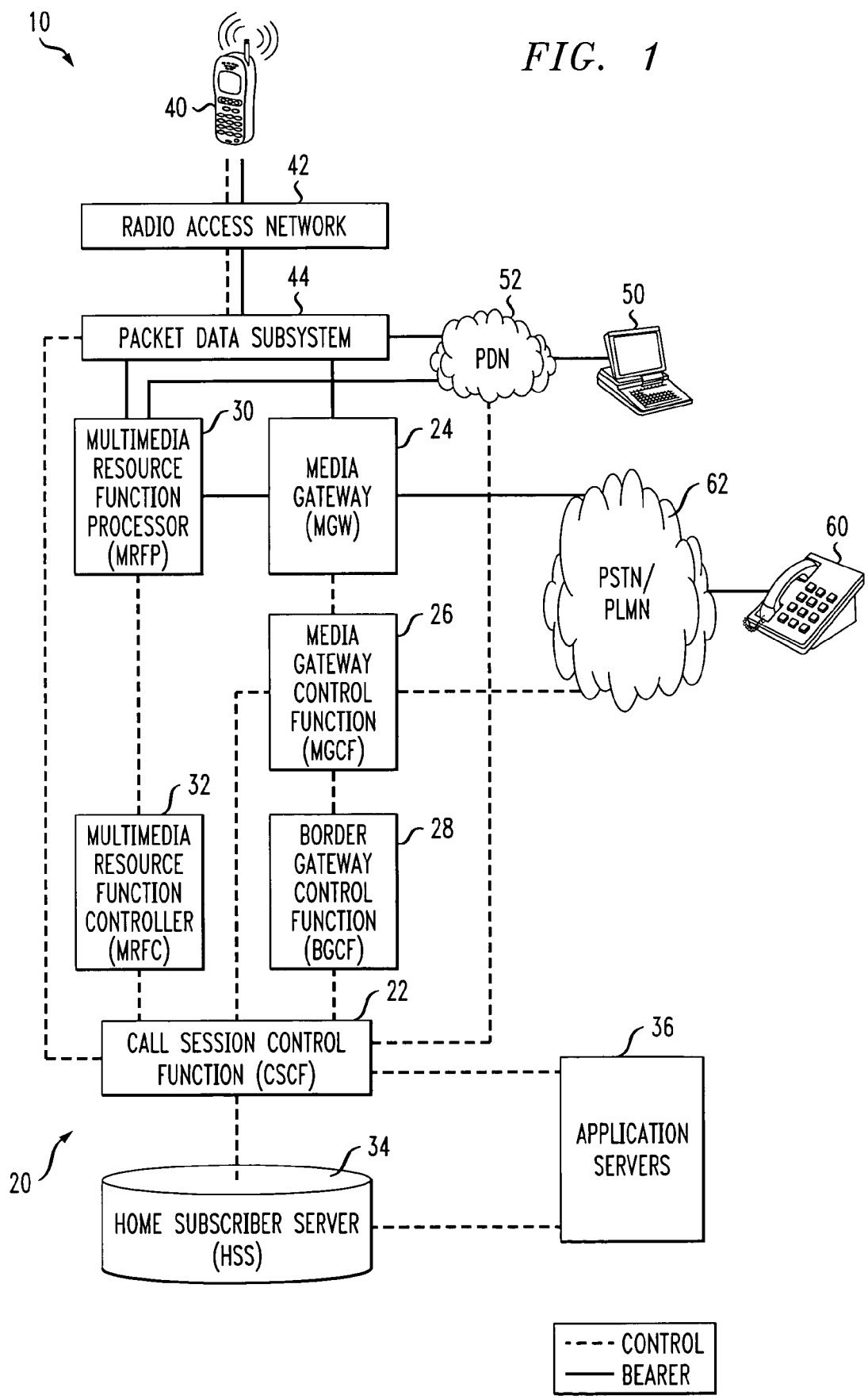
FIG. 1 is a block diagram showing a known multimedia telecommunications environment suitable for practicing aspects of the present invention.

3G—3$^{rd}$ Generation
3GPP—3$^{rd}$ Generation Partnership Project
3GPP2—3$^{rd}$ Generation Partnership Project 2
AAA—Authentication/Authorization/Accounting
AH—Address Handling
AS—Application Server
BGCF—Border Gateway Control Function
CCF—Call Control Function
CDMA—Code Division Multiple Access
CSCF—Call Session Control Function
HLR—Home Location Register
HSS—Home Subscriber Server
ICGW—Incoming Call Gateway
IMS—IP Multimedia Subsystem
IP—Internet Protocol
MGCF—Media Gateway Control Function
MGW—Media Gateway
MMT—Multimedia Terminal
MRFC—Multimedia Resource Function Controller
MRFP—Multimedia Resource Function Processor
PDN—Public Data Network
PLMN—Public Land Mobile Network
PSDN—Packet Switched Data Network
PSTN—Public Switched Telephone Network
PTT—Push-to-Talk
RAN—Radio Access Network
SIP—Session Initiation Protocol
SMS—Short Message Service
SMT—Single Media Terminal
SPD—Serving Profile Database
UMTS—Universal Mobile Telecommunications System
VoIP—Voice over IP
WLAN—Wireless Local Area Network FIG. 1 is a block diagram of a known multimedia telecommunications network 10 suitable for implementing aspects of the present invention. The multimedia telecommunications network 10 provides users, including prepaid wireless users, with a variety of options for communication. Users are able to transmit and receive multimedia communications, including audio, voice, video, and all types of data. The multimedia telecommunications network 10 provides access to data networks, such as the Internet, and public telephone networks, including wireless networks. It is to be understood, however, that other such networks may be suitable for implementing aspects of the present invention.

The multimedia telecommunications network 10 preferably includes an IP multimedia subsystem (IMS) 20. The IMS 20 relates to a technology standardized by the 3$^{rd}$ Generation Partnership Project, also known as 3GPP, and this system is also defined by 3GPP2 (3rd Generation Partnership Project 2). The IMS 20 is used to join mobile communication with IP technologies by adding the ability to deliver integrated voice and data services over the IP-based packet switched network. IMS services are based on the Session Initiation Protocol (SIP), which is the signaling protocol standard for next-generation 3GPP mobile wireless networks. The IMS 20 includes a number of system elements, such as a call session control function (CSCF) 22, media gateways (MGW) 24, a media gateway control function (MGCF) 26, a border gateway control function (BGCF) 28, a multimedia resource function processor (MRFP) 30, a multimedia resource function controller (MRFC) 32, a home subscriber system (HSS) 34 and application servers 36. As is known in the art, the IMS 20 manages call sessions and provides and administers packet switching for multimedia communications within the network 10.

A first communication device 40 is shown in FIG. 1. The first communication device 40 may be a wireless device that includes a user interface and an interface for coupling to a radio access network (RAN) 42. The user interface of the communication device 40 is typically referred to as terminal equipment and generally includes an audio interface, such as a microphone and speakers, a visual interface, such as a display, and a user input interface, such as a keyboard or touch pad. The interface for coupling to the RAN 42 is typically referred to as a mobile terminal and generally includes an over-the-air interface for transmitting and receiving data. The over-the-air interface of the communication device 40 is used to communicate with base stations in the RAN 42. Preferably, the communication device 40 and the base stations in the RAN 42 communicate over-the-air using a packet-based protocol. A packet data subsystem (PDS) 44 couples the RAN 42 with the IMS 20 and the public data network (PDN) 52 in the usual manner.

A second communication device 50 is shown as a laptop or notebook computer operatively connected to the IMS 20 via the PDN 52. The communication device 50 optionally employs a wireless local area network (WLAN) or wireline network, in the usual manner, to operatively connect to the PDN 52. A third communication device 60 is shown as an ordinary telephone equipped to handle only voice communications. The communication device 60 is operatively connected to the IMS 20 via the public switched telephone network/public land mobile network (PSTN/PLMN) 62.

Only three communication devices (40, 50, and 60) are shown in FIG. 1 for the purpose of simplifying the diagram. However, it is to be appreciated that any number of such terminals are typically situated in the multimedia telecommunications network 10. Additionally, while each is depicted as a specific type of communication device, other like terminals may also be incorporated.

With continuing reference to FIG. 1, the bearer paths that carry (or relay) the communication traffic and/or user information for transmission from one terminal to another, which are known in the art, are shown as solid lines. Control paths carry associated signaling and/or control commands (or messages) to and between appropriate network elements for the purpose of managing and routing call sessions. The control paths are shown as dashed lines in FIG. 1. Suitably, SIP and other known protocols are used on the control and bearer paths, respectively. For example, the known H.248 protocol is suitably employed for media gateway controls.

The CSCF 22, the BGCF 28, the MGCF 26, the MRFC 32 and the AS 36 comprise the call control and signaling functionality for the IMS 20, while the bearer paths interface with the MRFP 30 and the MGW 24 to provide and support interconnectivity to external networks and/or subsystems, such as the PDS 44, the PDN 52 and the PSTN/PLMN 62.

The CSCF 22 supports and controls multimedia sessions. The CSCF 22 invites elements such as the MGCF 26 and the MRFC 32 to call sessions to control the establishment and maintenance of bearer paths for call sessions by adding, modifying or deleting appropriate bearer paths for respective call sessions. The CSCF 22 is the signaling entity for call session control. It manages sessions by using SIP and/or other appropriate call/session establishment protocols, and it provides features and services and coordinates with other network elements for session control, service control and resource allocation.

The CSCF 22 may provide the following functionalities: incoming call gateway, call control function, serving profile database, and address handling. By functioning as an incoming call gateway the CSCF 22 acts as a call session entry point and routes incoming calls. The call control function generally refers to call setup/termination and state/event management. The CSCF 22 interacts with the MGCF 26 for calls to/from the PSTN/PLMN 62 and with the BGCF 28 for calls to the PSTN/PLMN 62 to determine the appropriate MGCF 26 to use. It also controls the MRFP 30 via the MRFC 32, which interprets information or signals coming from the CSCF 22 and controls the MFRP 30, in order to support conferencing and other multi-party services. SIP level registrations from subscribers are processed with the call control function. The call control function may also provide service trigger mechanisms to the application servers 24 to invoke services provided thereby, either locally, at the application servers 24, or elsewhere. It also reports call events for billing, auditing, intercept or other purposes, and may query the address handling function to check whether a requested communication is allowed given the current subscription. The serving profiling database function refers to the interaction of the CSCF 22 with the HSS 34 to receive and cache user profile information. The address handling function refers to address analysis, translation, modification (when appropriate) and mapping.

The MGW 24 acts as a bearer path interface between the IMS 20 and externals networks and/or subsystems, and provides translation resources and resources for modifying the bearer stream (e.g., encoding, transcoding, compression, packetization, depacketization, etc.). The bearer path elements include the MGCF 26, the MRFC 32, and the BGCF 28. These elements provide the flexibility to add, modify or delete bearers used by the users' services. More particularly, the MGW 24 interacts with the MGCF 26, which interprets signaling coming from the CSCF 22 and controls the MGW 24 to achieve resource allocation, bearer path control, and payload processing. The MGCF 26 communicates with the CSCF 22 in order to control the call state for media channels on one or more MGWs and performs conversions between Legacy and $3^{rd}$ Generation (3G) Universal Mobile Telecommunications System (UMTS)/Code Division Multiple Access (CDMA) network call control protocols. Similarly, the MRFC 32 controls the media stream resources in the MRFP 30, which also acts as a bearer path interface between the IMS 20 and external networks and/or subsystems, while being able to provide for conferencing or multiple party communications or other more advanced media services (relative to the MGW 24). The BGCF 28 selects the proper MGCF 26.

The HSS 34 is coupled to the CSCF 22 via a data link. The HSS 34 includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information.

The application servers 36 are preferably coupled to the IMS 20 for use in interaction with the communication devices 40, 50, 60. In particular, the CSCF 22 is coupled to the application servers 36 via a data link. Also, the HSS 34 is preferably coupled to the application servers 36. A myriad of services and applications may reside in or be coupled to the application servers 36, including a communication session type and quality selection method and system in accordance with the present invention.

In the preferred embodiment, the CSCF 22, the MGCF 26, the MGW 24, the HSS 34, and the application servers 36 are processor-based apparatus with data link interfaces for coupling together as described above and shown in FIG. 1. These apparatus include one or more processors that execute programs to implement the functionality described herein and generally associated with 3GPP/3GPP2 wireless systems. The flexibility of these processor-based systems permits ready integration into these systems of a communication session type and quality selection method and system in accordance with the present invention.

Thus, the IMS 20, as specified by 3GPP/3GPP2 and as described above, expands the ways people connect to each other beyond simple voice and messaging. New person-to-person applications enabled by the IMS 20 allow mobile devices to share media such as streaming video, game data, or any other data content and will enable virtually any IP-based media such as voice, images and video to be combined into a single session. And, as with any telecommunications system, the amount of bandwidth that is to be allocated to each communication session will be an important factor to the service providers and will affect the cost of the services provided.

As is generally known in the art, the amount of bandwidth that is allocated to a communication session within the network 10 depends, in part, on the type (e.g., telephony, fax, video telephony, high-quality voice transmission (audio), information retrieval, file transfer, messaging service, Internet access, or paging) and the quality (e.g., low or high quality) of the media used for communication. For example, with respect to size, 1 MB of data translates to around 25 photos, around 10 video clips, or around 500 mobile Web pages.

Accordingly, contemporary bandwidth requirements may vary, depending on the type of communication session. When voice signals are restricted to the 4 kHz frequency bandwidth used in telephony, a data rate of 64 kbit/s is generally required for digital transmission. A rate of 2.4 to 4.8 kbit/s can be entirely adequate for interactive alphanumerical applications. As is known in the art, bandwidth requirements can be significantly reduced by using data compression. The bandwidth required by today's video applications ranges from 10 Mbit/s for video to 900 Mbit/s for uncompressed, broadcast-quality high-definition television, or HDTV. Again, the volume of data actually transmitted can vary greatly depending on the optimization and compression techniques used. Sending a single screen page in color entails transmitting some 24 megabits. If the data is not compressed, it may take 6 minutes to render the image over a 64 kbit/s line, or 0.15 seconds over a 155 Mbit/s line. Table 1 shows the bandwidth requirements for image data.

TABLE 1

| Information Service | Bandwidth | Typical Application |
|---|---|---|
| Image transmission | <1 Mbit/s | Monochrome images |
| | 1–10 Mbit/s | Color images |
| | 10–100 Mbit/s | High-resolution color images |

Generally, video sequences place the heaviest load on network infrastructures. Thanks to the advanced data compression techniques developed over the past few years, however, data speed requirements for transmitting video data have dropped significantly. The first international standard for transmission of compressed video data, MPEG-1, processes 25 images per second at a resolution of 352×288 pixels. The MPEG-1 compression ratio is 26:1, resulting in a bit stream of 1.15 Mbit/s. As for audio communication, however, the bandwidth required for video conferencing increases with the number of conference participants. MPEG-2 processes 25 video images per second at a resolution of 720×576 pixels, which yields a level of quality equal to that of broadcast television. Transmission of MPEG-2 data requires over 4 Mbit/s, however. The high-resolution HDTV format (1000–1200 screen lines) requires 30 Mbit/s—after compression.

To deploy multimedia applications to new types of networks, including those employing lower bit rates such as wireless telephony and wireless LAN networks, the MPEG-4 standard was developed. It soon became an international standard and represents the various audio, visual, and audiovisual components of multimedia applications as separate units, called media objects. The data streams associated with these media objects can be multiplexed and transported over network channels providing QoS (Quality of Service) appropriate for the nature of the specific media object. This allows, for example, the transportation of the same MPEG-4 file as video and audio objects across high bandwidth networks, as still image and audio objects across low bandwidth networks. Depending on the screen content, however, the amount of bandwidth required can vary significantly. Video sequences that contain only slow or very little movement generate far less data than fast-changing images. Table 2 is a comparison of bandwidth requirements for various types of video.

TABLE 2

| User Interface | Resolution | Bandwidth (1 channel, half duplex) |
|---|---|---|
| Video (MPEG-1 compressed) | 352 × 288 | 1.15 Mbit/s |
| Video (MPEG-2 compressed) | 720 × 576 | 4 Mbit/s |
| Video (MPEG-3 compressed) (HDTV) | 1920 × 1080 | 20 Mbit/s |
| Video (MPEG-4 compressed) (Videophone) | 176 × 144 | 0.064 Mbit/s |

The bandwidth requirements may also vary depending upon the quality of the transmission, i.e., a high quality transmission requires more bandwidth than a low quality transmission.

An issue arises where a prepaid wireless user does not want to receive a high quality and/or type of service based upon the number of prepaid minutes (or airtime) available. Therefore, such a user may want to have the ability to change the quality and/or type of call that is received to save airtime, and, in essence, reduce the amount of bandwidth required for the call. This may be accomplished by specifying the type and/or quality of service for the transmission, such that the packet-based system will send data using less bandwidth. The negotiation of the change in bandwidth may be accomplished through the CSCF 22 and the communication device 40, but may also involve the application servers 36 (depending on the implementation). After the bandwidth requirements are established, the call is connected through the network 10.

Figure 2:
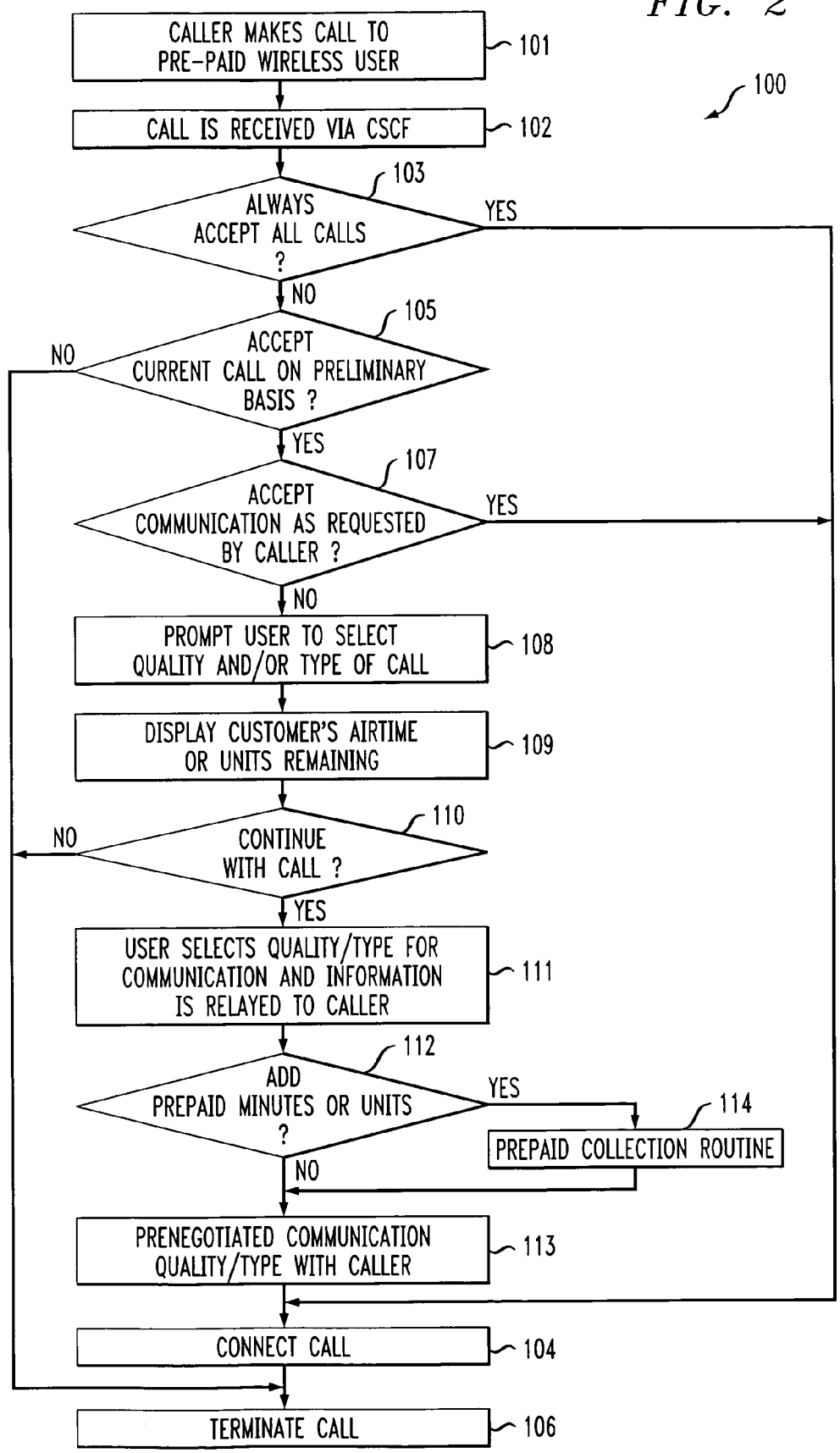
FIG. 2 is a flow chart illustrating a communication session type and quality adjustment process in accordance with an aspect of the present invention.

FIG. 2 is a flow chart illustrating a preferred method 100 of processing a user's adjustments to the type and/or quality of a communication session (in effect, adjusting the bandwidth requirements for the session) in accordance with the present invention. FIG. 2 is described below with reference to the network 10 of FIG. 1. It is to be understood that the method 100 may be implemented through software throughout the network 10. Initially in step 101, a caller using a communication device, such as communication device 50 or communication device 60, dials the number for the communication device 40, which preferably is being used by a prepaid wireless user. The call is initially received via the CSCF 22 in the usual manner (step 102). That is, calls from wire line networks or personal computers, such those represented by the communication device 50, generally reach the IMS 20 through the PDN 52 to the CSCF 22. On the other hand, calls from PSTN users, as represented by the communication device 60, generally reach the IMS 20 through the MGCF 26 and then reach the CSCF 22, while the bearer comes through the MGW 24. Next, a determination is made, preferably at an application server 36, as to whether the user has previously decided to accept all calls (step 103). It should be noted that this novel feature may be activated, by the user, for example, by entering a feature activation code (e.g., *78) on the communication device 40 or by any other known methods.

If the prepaid wireless user has previously decided to accept all calls, regardless of the type of communication received and the amount of airtime remaining, then the call is connected through the network 10 in the usual manner (step 104). That is, the CSCF 22 determines where the called party is located (by querying the HSS 34) and routes the call to that party. However, if the user has not decided to accept all calls, then the user would decide whether the call should be accepted on a preliminary basis (step 105). This information is received at the CSCF 22. If the user does not want to receive the call, then the call is terminated in the usual manner (step 106). Otherwise, the user would decide whether the call is to be accepted as requested by the caller (step 107). The user's mobile phone 40 may display in real-time preliminary information concerning the call, including the type of incoming call (e.g., voice, video, streaming video, text, images, file transfers) as well as the amount of prepaid units remaining (e.g. airtime minutes). It is to be understood that additional information for the prepaid wireless user could also be provided.

If the user decides to accept the call as requested by the caller, then the call is connected as in step 104. However, if the user does not wish to accept the call as requested, then the user is prompted by the network 10 to select the quality and/or type of call desired (step 108). To assist the user in making a decision, pertinent information such as the amount of prepaid units (and what these units translate to in terms of minutes) available for each type of call and the corresponding call quality is displayed in real-time on the user's mobile phone (step 109). The CSCF 22 generally receives this information from the AS 36 and the mobile device displays it. For example, the user's phone 40 may display the amount of airtime available to the user for each type of call—5 minutes for a high quality video session, 8 minutes for a low quality video session, 20 minutes for a high quality voice call, 30 minutes for a low quality voice call, 8 hours for text messaging. Of course, other choices and information may be made available to the user.

In step 110, the user decides whether the call should be continued. If not, the call is terminated as in step 106. However, if the call is to continue, the user selects the call quality and/or type (step 111), which information is forwarded to the CSCF 22 (which may be relayed to an AS 36), which, in turn, informs the calling party. In this step, the user is essentially adjusting the amount of bandwidth that will be allotted to the call. Thus, the user may choose to "save" airtime by reducing the quality of the call (e.g. from high to low) and by changing the type of call received (e.g., from a video call to a voice call).

Next, a determination is made as to whether additional prepaid units should be added (in case the user's prepaid units are down to a low number) (step 112). If no prepaid units are to be added, then a pre-selected call quality and/or type with the caller is selected (step 113). The call quality and/or type may be the one chosen by the user earlier, or it may be different, depending on what has been negotiated with the caller. The call is then connected as in step 104. However, if prepaid units are to be added, then a typical prepaid collection routine is run (step 114). Next, a pre-selected call quality and/or type with the caller is selected as in step 113, and the call is connected as in step 104. Once the call is released due to the caller or the user hanging up or once the user has no more prepaid units remaining, the call is terminated as in step 106.

In an alternative embodiment, the user may be able to make further changes during the call as the user's airtime diminishes, such as extending the length of the call by reducing the quality, adding additional prepaid units to the user's account, increasing the bandwidth desired for that call, etc.

To summarize, the bandwidth requirements for a multimedia call may be adjusted by a prepaid wireless user, in accordance with the present invention. A prepaid wireless user may not want to receive a high quality and/or type of service based upon the number of prepaid minutes (or airtime) available. Therefore, the changing of the quality and/or type of call received is typically a reduction in the amount of bandwidth required for the call. This may be accomplished by specifying the type and/or quality of service for the transmission, such that the packet-based system will send data using less bandwidth. The negotiation of the change in bandwidth is accomplished by signaling possibly done by the CSCF 22 and involving the communication device 40 and application servers 36 (depending on the implementation). After the bandwidth requirements are established, the call is connected through the network 10.

The invention has been described with reference to the preferred embodiments. Obviously, modifications and alterations will occur to others upon reading and understanding the preceding detailed description of the preferred embodiments. It is intended that the invention be construed as including all such modifications and alterations insofar as they come within the scope of the appended claims or the equivalence thereof.

We claim:

1. In a multimedia telecommunications network, a method of processing multimedia calls, the method comprising:
  receiving at a first network element a multimedia call from a caller using a first communication device to a prepaid wireless user using a second communication device, the prepaid wireless user having an amount of airtime remaining for the second communication device;
  displaying in real-time a plurality of available call features and the amount of airtime remaining on the second communication device;
  prompting the prepaid wireless user to select the call features from the plurality of available call features via the second communication device;
  receiving the user's selected call features at the first network element;
  routing the selected call features from the first network element to a second network element and then to the caller;
  setting up the call according to the selected call features; and
  connecting the call.

2. The method defined in claim 1, further comprising:
  where the prepaid wireless user desires to add more airtime, running a prepaid wireless collection routine.

3. The method defined in claim 1, wherein the multimedia call is one of voice call, a fax message, a video call, a high-quality voice transmission, a file transfer, or a messaging service.

4. The method defined in claim 1, wherein the first communication device is one of a wireless telephone, a personal computer, a notebook computer, or a personal digital assistant.

5. The method defined in claim 1, wherein the second communication device is one of a wireless telephone, a personal computer, a notebook computer, or a personal digital assistant.

6. The method defined in claim 1, wherein the available call features include the amount of airtime available for each type of call and the corresponding call quality.

7. The method defined in claim 1, wherein the selected call features include the type of call and the quality of the call.

8. The method defined in claim 1, wherein the telecommunications network includes an IP multimedia subsystem.

9. The method defined in claim 6, wherein the first network element comprises a call session control function in the IP multimedia subsystem.

10. The method defined in claim 7, wherein the second network element comprises an application server in the IP multimedia subsystem.

11. In a multimedia telecommunications network, a system for processing multimedia calls, the system comprising:
  means for receiving a multimedia call from a caller using a first communication device to a prepaid wireless user using a second communication device, the prepaid wireless user having an amount of airtime remaining for the second communication device;
  means for displaying in real-time a plurality of available call features and the amount of airtime remaining on the second communication device;
  means for prompting the prepaid wireless user to select the call features from the plurality of available call features via the second communication device;
  means for receiving the user's selected call features at the first network element;

means for routing the selected call features from the first network element to a second network element and then to the caller;

means for setting up the call according to the selected call features; and means for connecting the call.

12. The system defined in claim 11, further comprising means for running a prepaid wireless collection routine.

13. The system defined in claim 11, wherein the multimedia call is one of voice call, a fax message, a video call, a high-quality voice transmission, a file transfer, or a messaging service.

14. The system defined in claim 11, wherein the first communication device is one of a wireless telephone, a personal computer, a notebook computer, or a personal digital assistant.

15. The system defined in claim 11, wherein the second communication device is one of a wireless telephone, a personal computer, a notebook computer, or a personal digital assistant.

16. The system defined in claim 11, wherein the available call features include the amount of airtime available for each type of call and the corresponding call quality.

17. The system defined in claim 11, wherein the selected call features include the type of call and the quality of the call.

18. The system defined in claim 11, wherein the telecommunications network includes an IP multimedia subsystem.

* * * * *